United States Patent [19]

Takada

[11] Patent Number: 5,555,122
[45] Date of Patent: Sep. 10, 1996

[54] LIGHT SCANNING DEVICE

[75] Inventor: Norihisa Takada, Kanagawa-ken, Japan

[73] Assignee: Fuji Photo Film Co., Ltd., Kanagawa, Japan

[21] Appl. No.: 402,694

[22] Filed: Mar. 13, 1995

[30]   Foreign Application Priority Data

Apr. 11, 1994 [JP] Japan .................................. 6-071984

[51] Int. Cl.$^6$ ................................................ G02B 26/08
[52] U.S. Cl. .......................... 359/196; 359/198; 359/212; 359/214; 359/215; 359/223; 347/259; 347/260
[58] Field of Search .................................... 359/196–226, 359/871–872; 347/241–245, 256–263; 358/296, 302, 474, 494; 250/234–236

[56]   References Cited

FOREIGN PATENT DOCUMENTS

264521   3/1990   Japan .............................. G02B 26/10

*Primary Examiner*—James Phan
*Attorney, Agent, or Firm*—Sughrue, Mion, Zinn, Macpeak & Seas

[57]   ABSTRACT

A light scanning device for scanning a scanned medium in a main scanning direction with a light beam has a detachable scanning unit having a reflecting mirror and a resonant light deflector. The scanning unit has a first adjusting mechanism for tilting the reflecting mirror about one axis to correct for a bow and an offset of a scanning line on the scanned medium in an auxiliary scanning direction substantially perpendicular to the main scanning direction, and a second adjusting mechanism for tilting the resonant light deflector about two axes to correct for a bow, a lean and an offset, respectively, of the scanning line on the scanned medium. When the resonant light deflector is to be replaced, the scanning unit is replaced with a new scanning unit which has already been adjusted. Therefore, the whole process of replacing the scanning unit can easily and quickly be carried out.

2 Claims, 8 Drawing Sheets

LIGHT SCANNING DEVICE

BACKGROUND OF THE INVENTION

1. Field of the Invention

The present invention relates to a light scanning device for applying a scanning light beam to a scanned medium to record image information on or read image information from the scanned medium by scanning the scanned medium with the scanning light beam.

2. Description of the Related Art

There are known light scanning devices in which a light beam emitted by a light beam generator is applied to scan a scanned medium in a main scanning direction by a scanning optical system including a light beam deflector, a scanning lens, etc. Such light scanning devices are widely used in recording apparatus which record a desired image on a medium with a scanning light beam and reading apparatus which photoelectrically read a recorded image from a medium.

The light beam deflector in such a light scanning device comprises a resonant light deflector, a rotating polygonal mirror, a galvanometer mirror, or the like. The light beam deflector has a reflecting surface or surfaces which tend to be unduly slanted, causing an error often known as a "facet error", due to manufacturing errors, attachment errors, or the like. If the reflecting surface or surfaces are unduly slanted, then a scanning line produced on the scanned medium when the scanned medium is scanned in the main scanning direction by the light beam is bowed, leaned, and positionally displaced (offset) in an auxiliary scanning direction which is normal to the main scanning direction.

It has been proposed to correct the path of a scanning beam as disclosed in Japanese laid-open patent publication No. 2-64521. According to the disclosed correcting process, the amounts of bow and lean of the scanning line on the scanned medium are measured, then the light beam deflector is tilted through a corrective angle that has been determined based on the measured amounts of bow and lean, and a reflecting mirror disposed between the scanning lens and the scanned medium is tilted if necessary for thereby correcting the scanning line for its offset in the auxiliary scanning direction.

With the above conventional correcting process, after the measured amounts of bow and lean have been compensated for with respect to the light beam deflector, the reflecting mirror is adjusted to correct for the offset of the scanning line. Therefore, if the light beam deflector is to be replaced with a new light beam deflector, then it is necessary to make adjustments for the new light beam deflector, and make adjustments for the reflecting mirror to match the new light beam deflector. Consequently, the overall adjustment procedure required by a light beam deflector replacement is considerably tedious and time-consuming.

SUMMARY OF THE INVENTION

It is therefore an object of the present invention to provide a light scanning device which is capable of efficiently correcting for a bow, lean, and positional deviation in an auxiliary scanning direction of a scanning line that is produced on a scanning medium when it is scanned in a main scanning direction by a light beam, for thereby allowing a light beam deflector to be easily and quickly replaced.

To achieve the above object, there is provided in accordance with the present invention a light scanning device comprising light beam generating means for generating a light beam, and a detachable scanning unit for scanning a scanned medium in a main scanning direction with the light beam generated by the light beam generating means, the scanning unit including light beam deflecting means for deflecting the light beam from the light beam generating means to scan the scanned medium with the deflected light beam, a reflecting mirror for guiding the light beam from the light beam generating means to the light beam deflecting means, a first adjusting mechanism for angularly adjusting the reflecting mirror about one axis to correct for a bow and an offset of a scanning line on the scanned medium in an auxiliary scanning direction substantially perpendicular to the main scanning direction, and a second adjusting mechanism for angularly adjusting the light beam deflecting means about two axes to correct for a bow, a lean, and an offset, respectively, of the scanning line on the scanned medium.

The reflecting mirror can be angularly adjusted or tilted about the one axis by the first adjusting mechanism, and the light beam deflecting means can be angularly adjusted or tilted about the two axes by the second adjusting mechanism, for thereby correcting for a bow and a lean of the scanning line at the time the optical beam is scanned in the main scanning direction, and an offset of the scanning line in the auxiliary scanning direction.

Since the reflecting mirror and the light beam deflecting means are installed in the scanning unit, the reflecting mirror and the light beam deflecting means can be angularly adjusted or tilted in advance in the scanning unit. When the light beam deflecting means is to be replaced, the scanning unit can be replaced with a new scanning unit which has already been adjusted, with no subsequent adjustments required for the new scanning unit. Therefore, the whole process of replacing the scanning unit can easily and quickly be carried out.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
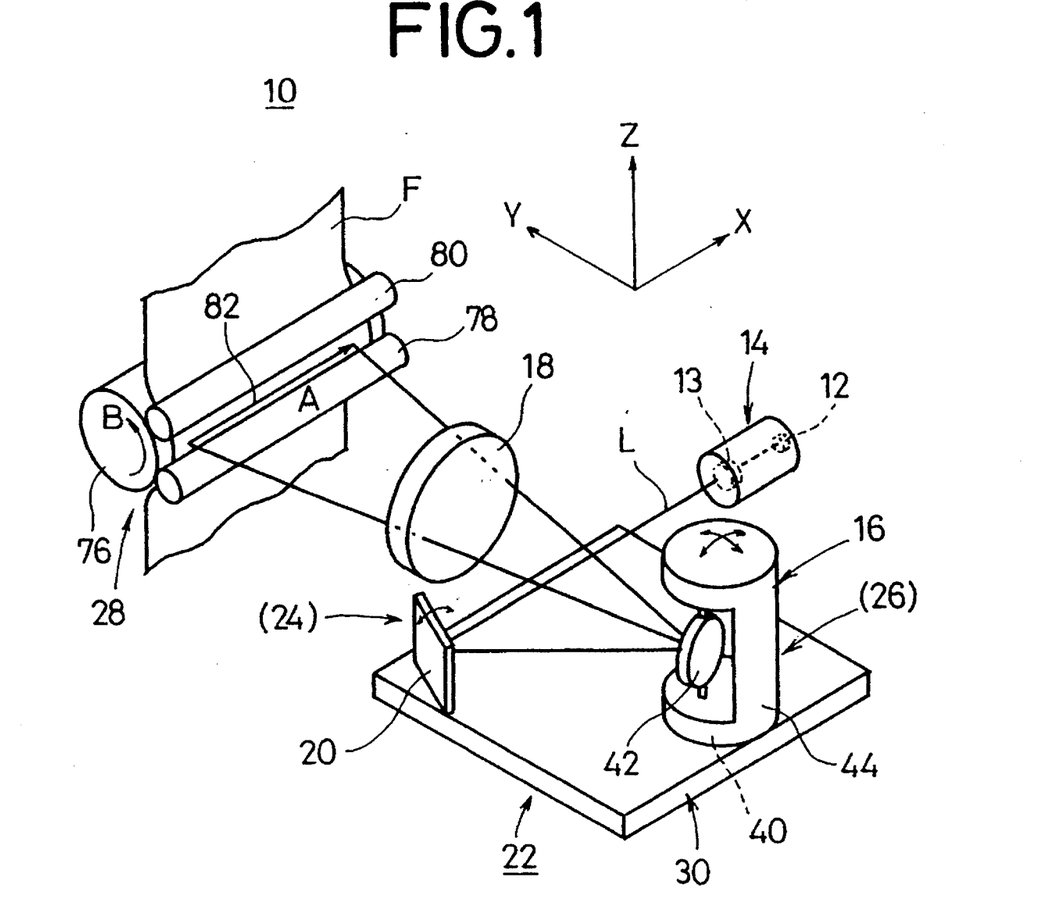
FIG. 1 is a schematic perspective view of a recording apparatus which incorporates a light scanning device according to the present invention.

FIG. 1 shows a recording apparatus 10 which incorporates a light scanning device according to the present invention. As shown in FIG. 1, the recording apparatus 10 comprises a laser diode unit 14 including a laser diode (recording light source) 12 for emitting a light beam L such as a laser beam and a collimator lens 13, a resonant light deflector (light beam deflecting means) 16 for reflecting and deflecting the light beam L in a main scanning direction indicated by the arrow A, an fθ lens 18 serving as a scanning lens, a reflecting mirror 20 for reflecting the light beam L emitted from the laser diode unit 14 toward the resonant light deflector 16, a scanning unit 22 including the reflecting mirror 20 and the resonant light deflector 16, a first adjusting mechanism 24 for tilting the reflecting mirror 20 in the scanning unit 22 about a single axis, i.e., a Y-axis, a second adjusting mechanism 26 for tilting the resonant light deflector 16 in the scanning unit 22 about two axes, i.e., Y- and X-axes, and an auxiliary scanning feed mechanism 28 for feeding a film (scanned medium) F in an auxiliary scanning direction indicated by the arrow B which is substantially perpendicular to the main scanning direction A.

The scanning unit 22 has a unit base 30 on which there are mounted a first attachment 32 for the resonant light deflector 16 and a second attachment 34 for the reflecting mirror 20. The first attachment 32 has a conical surface 36 (see FIG. 3) extending around a vertical axis and a hole 38 defined at a smaller-diameter end of the conical surface 36.

Figure 3:
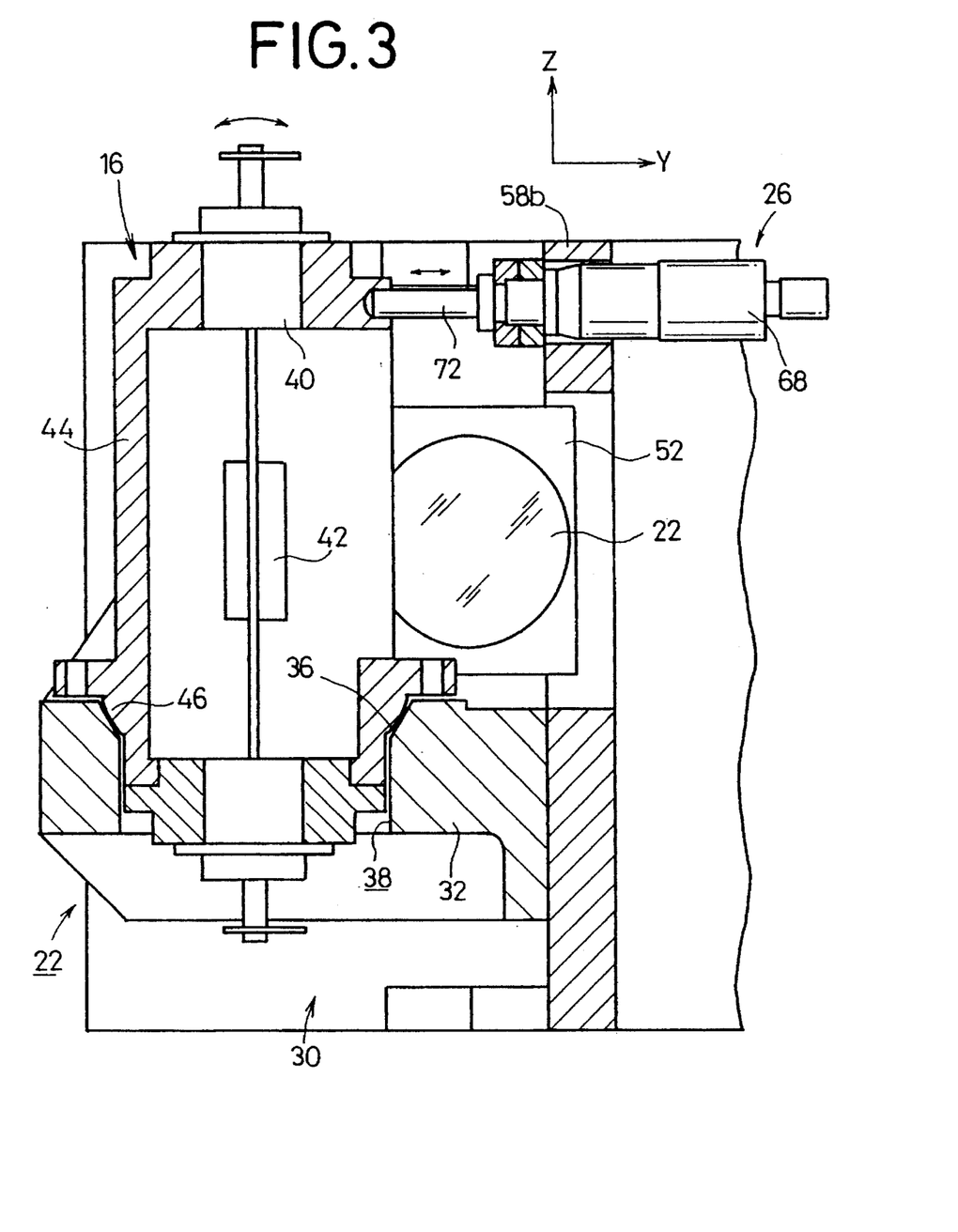
FIG. 3 is a cross-sectional view taken along line III—III of FIG. 2.
Figure 4:
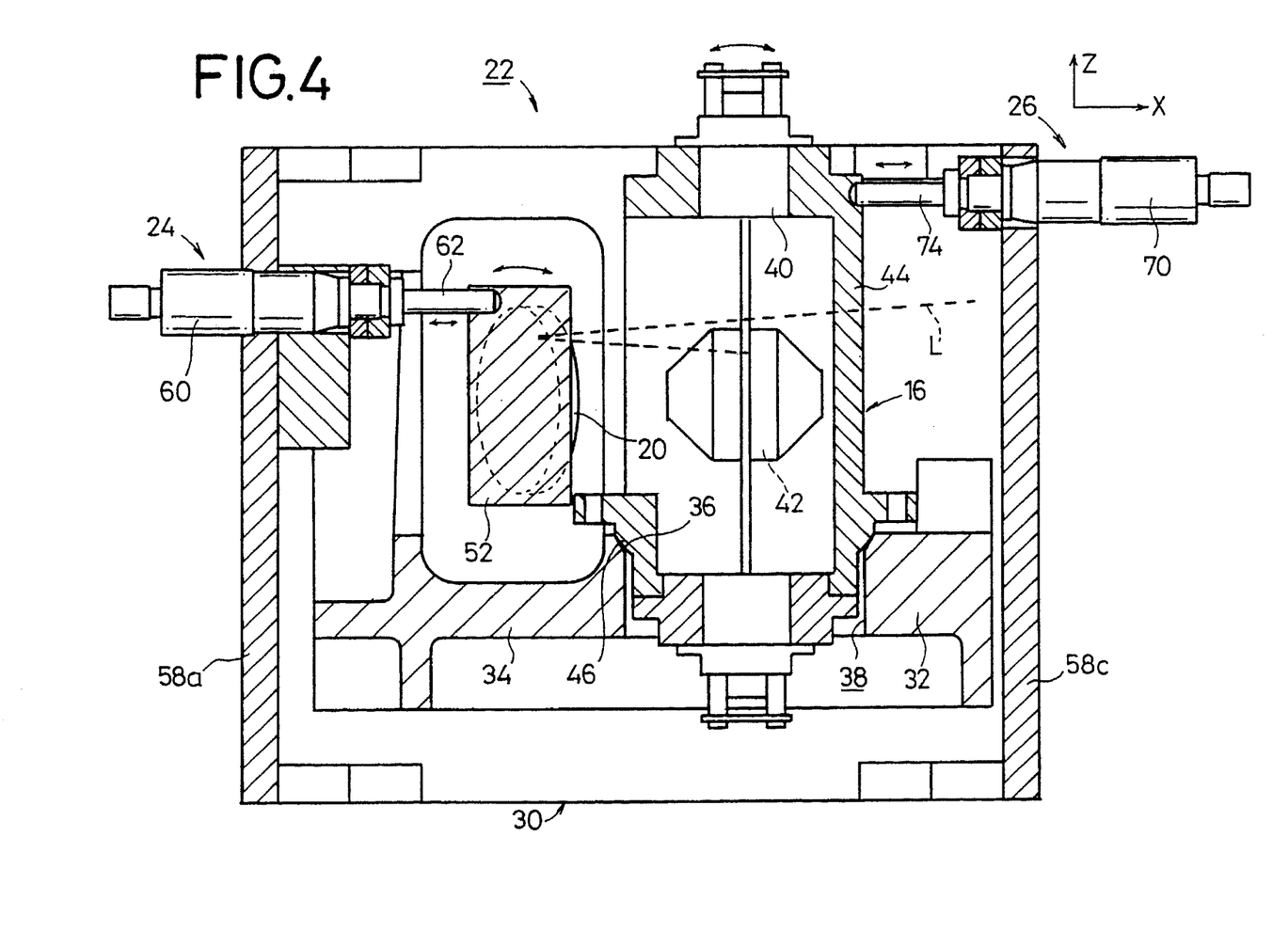
FIG. 4 is a cross-sectional view taken along line IV—IV of FIG. 2.

As shown in FIGS. 3 and 4, the resonant light deflector 16 comprises a plane mirror 42 oscillatable about a vertical axis by an actuator 40 and a casing 44 which houses the plane mirror 42. The casing 44 has a partly spherical surface 46 on its lower outer circumference which is held against the conical surface 36. The partly spherical surface 46 and the conical surface 36 jointly make up a spherical support structure. The resonant light deflector 16 is allowed by the spherical support structure to be tilted in any of various directions with respect to the first attachment 32, and can be fixed in a desired tilted attitude by a screw.

Figure 5:
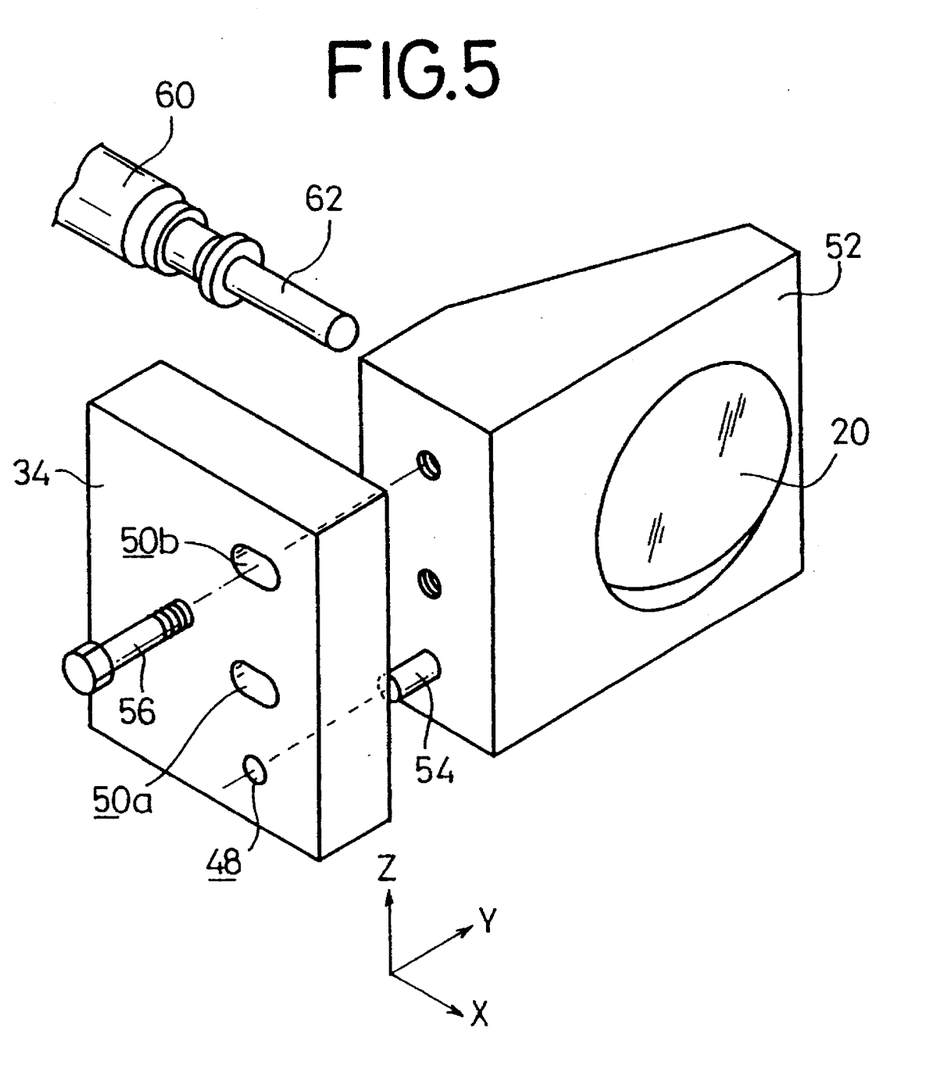
FIG. 5 is a fragmentary exploded perspective view showing the manner in which a reflecting mirror of the scanning unit is installed.

As shown in FIG. 5, the second attachment 34 is erected in a vertical direction, i.e., a Z-axis direction, and has a pin hole 48, an oblong hole 50a, and an oblong hole 50b which are defined successively upwardly in a side wall thereof. The reflecting mirror 20 is mounted in a predetermined angular attitude in a holder 52 that is joined to the second attachment 34. A pin 54 inserted in the pin hole 48 is fitted in a hole defined in a lower end of a side surface of the holder 52. The oblong holes 50a, 50b are elongate in an X-axis direction. Screws 56 loosely fitted in the respective oblong holes 50a, 50b are threaded in the side surface of the holder 52 for thereby securing the holder 52 in a desired tilted attitude.

Figure 2:
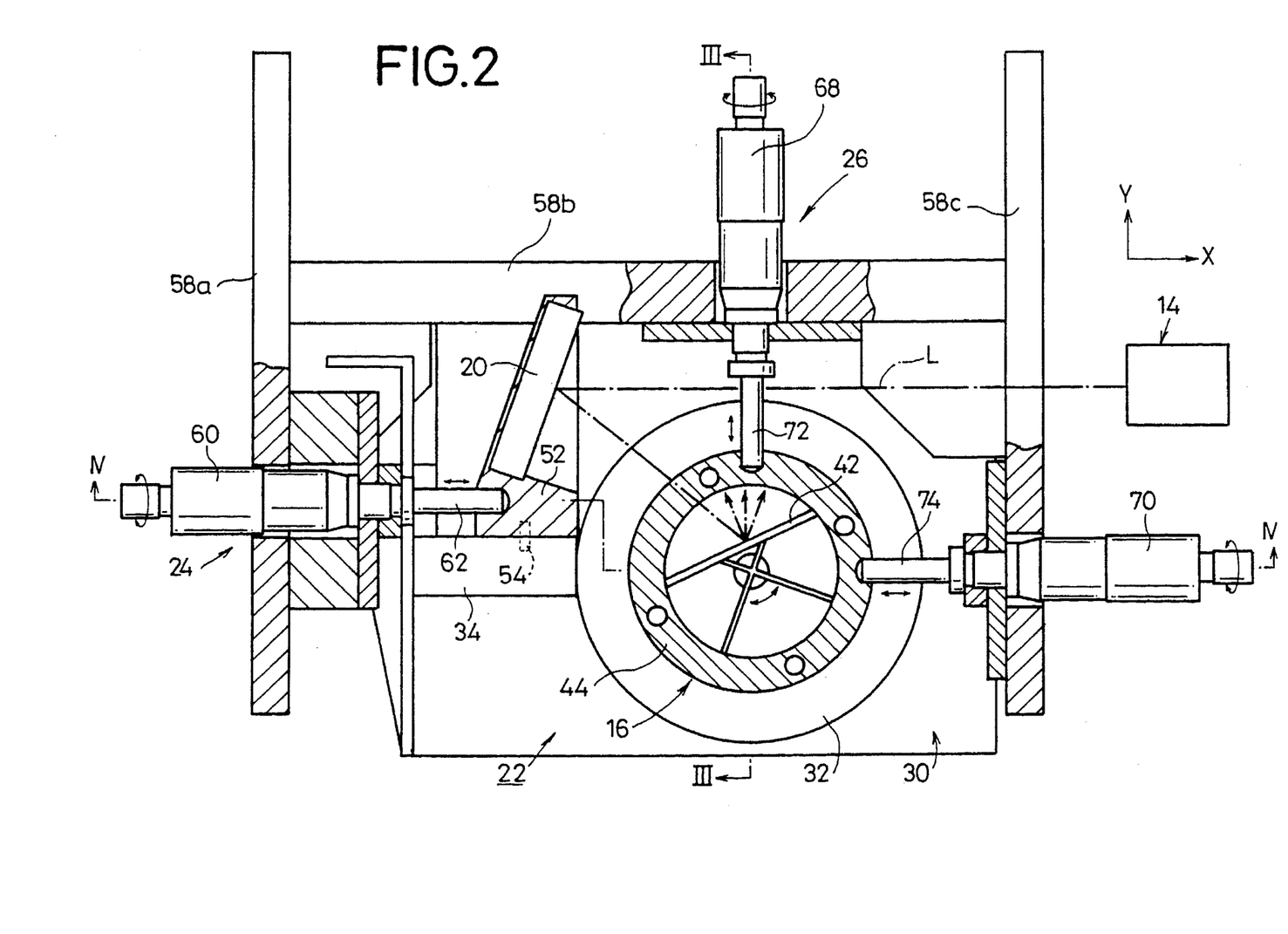
FIG. 2 is a plan view, partly in cross section, of a scanning unit in the recording apparatus.

When the reflecting mirror 20 and the resonant light deflector 16 are tilted, the unit base 30 is connected to first, second, and third jigs 58a, 58b, 58c (see FIG. 2). The first adjusting mechanism 24 has a first micrometer head 60 which is horizontally held by the first jig 58a. The first micrometer head 60 has a spindle 62 extending in the X-axis direction and engaging an upper end of the holder 52 (see FIGS. 2 and 4).

The second adjusting mechanism 26 has a second micrometer head 68 which is held by the second jig 58b that extends perpendicularly to the first jig 58a, and a third micrometer head 70 which is held by the third jig 58c that extends perpendicularly to the second jig 58b. The second micrometer head 68 has a spindle 72 extending in the Y-axis direction perpendicular to the X-axis direction and engaging an upper end of the resonant light deflector 16, and the third micrometer head 70 has a spindle 74 extending in the X-axis direction and engaging the upper end of the resonant light deflector 16 (see FIGS. 2 through 4).

As shown in FIG. 1, the auxiliary scanning feed mechanism 28 for feeding the film F in the auxiliary scanning direction B has a feed drum 76 of relatively large diameter which can be rotated about its own axis by a motor (not shown), and a pair of nip rollers 78, 80 for holding the film F against the feed drum 76.

The recording apparatus 10 operates as follows:

When the laser diode unit 14 is energized, the light beam L emitted thereby which has been modulated by image information is reflected toward the resonant light deflector 16 by the reflecting mirror 20. In the resonant light deflector 16, the plane mirror 42 is oscillated by the actuator 40 to deflect the light beam L in the main scanning direction A. The light beam L thus deflected travels through the fθ lens 18 toward the film F.

In the auxiliary scanning feed mechanism 28, the feed drum 76 is rotated to feed the film F in the auxiliary scanning direction B while the film F is being gripped between the feed drum 76 and the nip rollers 78, 80. Therefore, an image is recorded two-dimensionally on the film F by the modulated light beam L.

Figure 6:
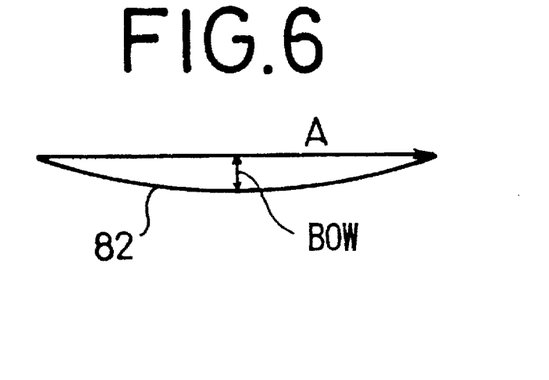
FIG. 6 is a diagram illustrative of a bow of a scanning line.
Figure 7:
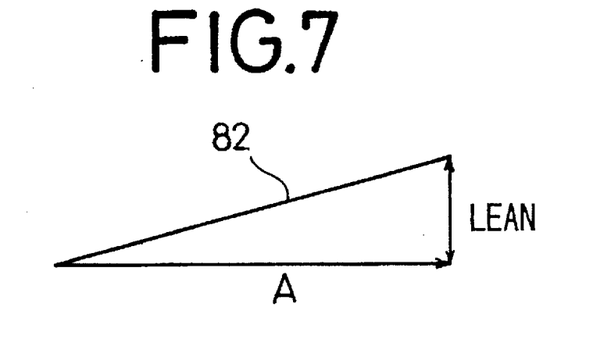
FIG. 7 is a diagram illustrative of a lean of a scanning line.
Figure 8:
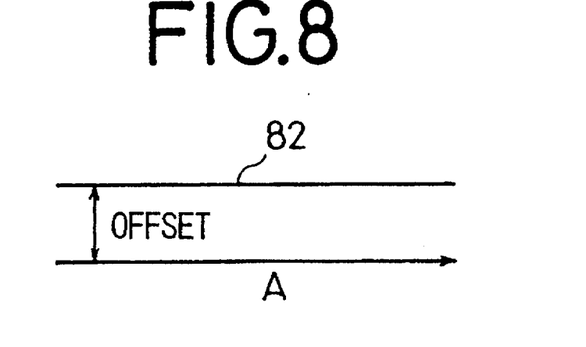
FIG. 8 is a diagram illustrative of an offset of a scanning line.

The plane mirror 42 may be tilted due to a manufacturing error, an attachment error, or the like of the resonant light deflector 16. When the plane mirror 42 is tilted, a scanning line 82 produced on the film F that is scanned in the main scanning direction A by the light beam L is bowed with respect to the main scanning direction A as shown in FIG. 6, leaned to the main scanning direction A as shown in FIG. 7, and offset in the auxiliary scanning direction B as shown in FIG. 8.

The degrees to which the scanning line 82 is bowed, leaned, and offset, hereinafter also referred to as bow, lean, and offset, respectively, of the scanning line 82, can be eliminated by the first and second adjusting mechanisms 24, 26 in the scanning unit 22. Operation of the first and second adjusting mechanisms 24, 26 will be described below.

Figure 9:
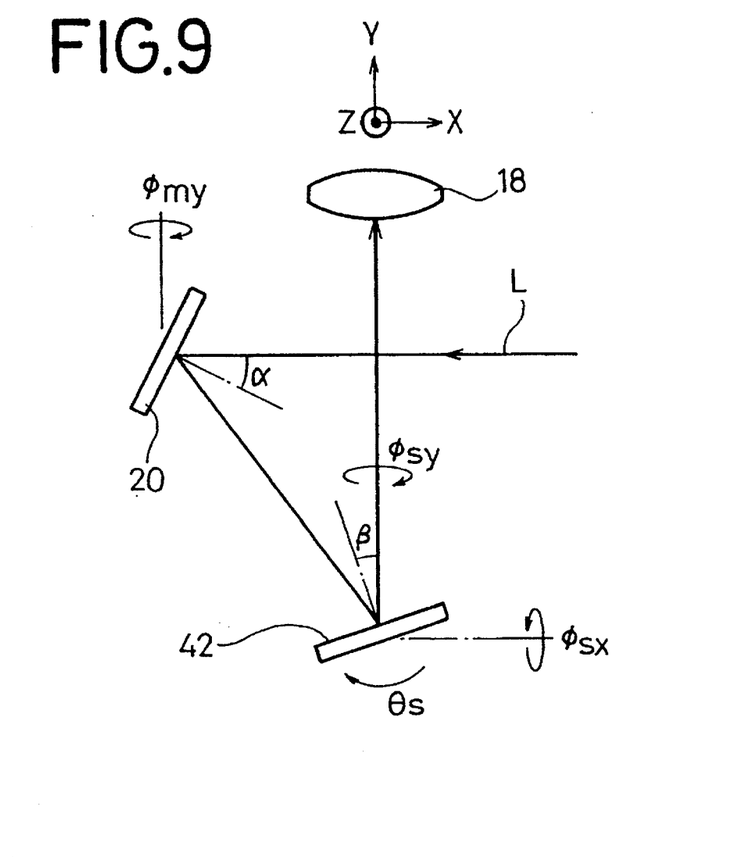
FIG. 9 is a diagram showing the positional relationship between a reflecting mirror, a plane mirror, and an fθ mirror.

As shown in FIG. 9, it is assumed that the angle through which the reflecting mirror 20 is tilted about the Y-axis is represented by $\phi_{my}$, the angle through which the plane mirror 42 is titled about the X-axis by $\phi_{sx}$, the angle through which the plane mirror 42 is titled about the Y-axis by $\phi_{sy}$, and the angle through which the plane mirror 42 is titled about the Z-axis by $\theta_s$. When the angles $\phi_{my}$, $\phi_{sx}$, $\phi_{sy}$ are 0, if an incident vector $I_1$ of the light beam L to the reflecting mirror 20, a normal vector $M_1$ to the reflecting mirror 20, and a normal vector $M_2$ to the plane mirror 42 are indicated respectively by:

$$I_1 = \begin{pmatrix} -1 \\ 0 \\ 0 \end{pmatrix} \quad M_1 = \begin{pmatrix} \cos\alpha \\ -\sin\alpha \\ 0 \end{pmatrix} \quad M_2 = \begin{pmatrix} -\sin(\beta - \theta_s) \\ \cos(\beta - \theta_s) \\ 0 \end{pmatrix} \quad (1)$$

then a reflected vector $R_1$ from the reflecting mirror 20 is expressed by $R_1 = I_1 - 2(I_1 \cdot M_1)M_1$ where $I_1 \cdot M_1$ represents the inner product of the vectors $I_1$, $M_1$, and a reflected vector $R_2$ from the plane mirror 42, i.e., an incident vector to the fθ lens 18, is expressed by $R_2=R_1-2(R_1 \cdot M_2)M_2$.

Figure 10:
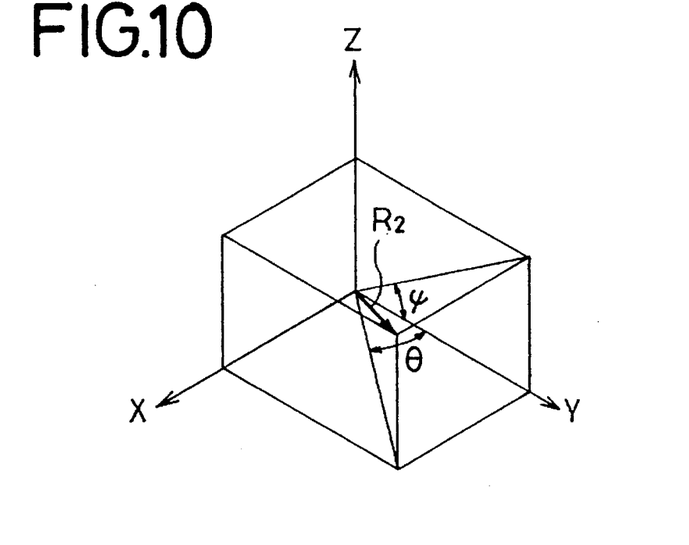
FIG. 10 is a diagram illustrative of a normal vector to the plane mirror.

If the reflected vector $R_2$ is represented by:

$$R_2 = \begin{pmatrix} r_x \\ r_y \\ r_z \end{pmatrix} \quad (2)$$

and the angles formed between images produced by mapping the reflected vector $R_2$ onto XY and YZ planes and the Y-axis are represented respectively by $\theta$, $\psi$ (see FIG. 10), then the equations $r_x = r_y \tan\theta$ and $r_z = r_y \tan\psi$ are satisfied.

The position of a focused point produced by the f$\theta$ lens 18 can then be calculated according to:

$$X = f \cdot \tan^{-1}\sqrt{\tan^2\theta + \tan^2\psi} \cdot \cos\left(\tan^{-1}\frac{\tan\psi}{\tan\theta}\right) \quad (3)$$

$$Z = f \cdot \tan^{-1}\sqrt{\tan^2\theta + \tan^2\psi} \cdot \sin\left(\tan^{-1}\frac{\tan\psi}{\tan\theta}\right)$$

If the reflecting mirror 20 is tilted through a small angle $\Phi_{my}$, then a normal vector $M_1'$ to the reflecting mirror 20 can be calculated according to:

$$M_1' = \begin{pmatrix} \cos\phi_{my} & 0 & \sin\phi_{my} \\ 0 & 1 & 0 \\ -\sin\phi_{my} & 0 & \cos\phi_{my} \end{pmatrix} \begin{pmatrix} \cos\alpha \\ -\sin\alpha \\ 0 \end{pmatrix} \quad (4)$$

If the plane mirror 42 is tiled through small angles $\phi_{sx}$, $\phi_{sy}$, then a normal vector $M_2'$ to the plane mirror 42 can be calculated according to:

$$M_2' = \quad (5)$$

$$\begin{pmatrix} 1 & 0 & 0 \\ 0 & \cos\phi_{sx} & -\sin\phi_{sx} \\ 0 & \sin\phi_{sx} & \cos\phi_{sx} \end{pmatrix} \begin{pmatrix} \cos\phi_{sy} & 0 & \sin\phi_{my} \\ 0 & 1 & 0 \\ -\sin\phi_{my} & 0 & \cos\phi_{my} \end{pmatrix} \begin{pmatrix} -\sin(\beta-\theta_s) \\ \cos(\beta-\theta_s) \\ 0 \end{pmatrix}$$

Therefore, the position of a focused point produced by the f$\theta$ lens 18 can similarly be calculated.

A process of determining the scanning position on a focused plane when the plane mirror 42 is oscillated and correcting for the bow, lean, and offset of the scanning line 82 based on the above concept will be described below.

Figure 11:
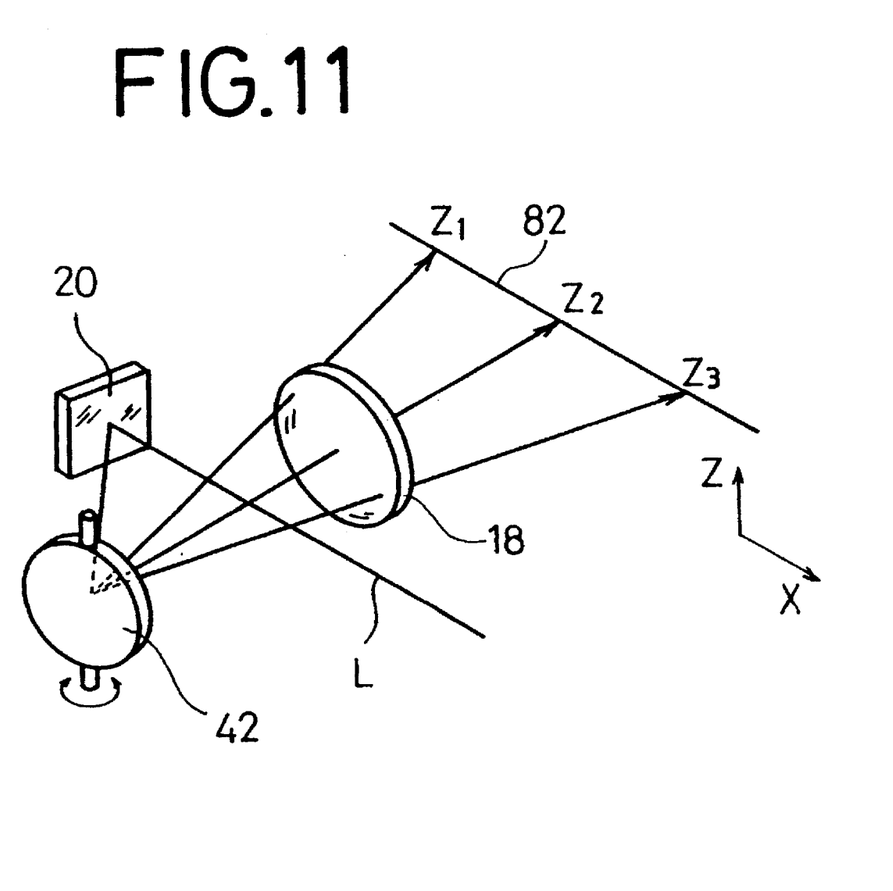
FIG. 11 is a view illustrative of the position of a scanning line at focus.

As shown in FIG. 11, left, central, and right positions on the scanning line 82 in the Z-axis direction within the angle of field are indicated by $Z_1$, $Z_2$, and $Z_3$, respectively, and the bow of the scanning line 82 is defined as $(Z_1+Z_2)/2-Z_2$, the lean of the scanning line 82 as $Z_3-Z_1$, and the offset of the scanning line 82 as $Z_2$.

Based on the above definition, the bow, lean, and offset of the scanning line 82 at the time the reflecting mirror 20 is tilted $\phi_{my}$ and the plane mirror 42 is tilted 0 can be calculated in the manner described above. If the bow, lean, and offset of the scanning line 82 have respective values $B_1$, $L_1$, and $O_1$, then the relationship of the bow, lean, and offset to the angle $\phi_{my}$ is expressed by:

$$\begin{pmatrix} \text{BOW} \\ \text{LEAN} \\ \text{OFFSET} \end{pmatrix} = \begin{pmatrix} B_1 \\ L_1 \\ O_1 \end{pmatrix} \phi_{my} \quad (6)$$

Similarly, if the bow, lean, and offset of the scanning line 82 have respective values $B_2$, $L_2$, and $O_2$ at the time the plane mirror 42 is tilted $\phi_{sx}\neq 0$ and $\phi_{my}=\phi_{sy}=0$, and also if the bow, lean, and offset of the scanning line 82 have respective values $B_3$, $L_3$, and $O_3$ at the time the plane mirror 42 is tilted $\phi_{sy}\neq 0$ and $\phi_{my}=\phi_{sx}=0$, then the relationship of the bow, lean, and offset to the angles $\phi_{my}$, $\phi_{sx}$, $\phi_{sy}$ is expressed by:

$$\begin{pmatrix} \text{BOW} \\ \text{LEAN} \\ \text{OFFSET} \end{pmatrix} = \begin{pmatrix} B_1 & B_2 & B_3 \\ L_1 & L_2 & L_3 \\ O_1 & O_2 & O_3 \end{pmatrix} \begin{pmatrix} \phi_{my} \\ \phi_{sx} \\ \phi_{sy} \end{pmatrix} \quad (7)$$

Consequently, when the unit base 30 with the angles $\phi_{my}$, $\phi_{sx}$, $\phi_{sy}$ unadjusted are installed on the first, second, and third jigs 58a, 58b, 58c, if the values of the bow, lean, and offset of the scanning line 82 which are determined by measuring the positions $Z_1$, $Z_2$, $Z_3$ are represented by $B_0$, $L_0$, $O_0$, respectively, then adjusting angles $\phi'_{my}$, $\phi'_{sx}$, $\phi'_{sy}$ for eliminating the values $B_0$, $L_0$, $O_0$ of the bow, lean, and offset can be calculated according to:

$$\begin{pmatrix} \phi'_{my} \\ \phi'_{sx} \\ \phi'_{sy} \end{pmatrix} = -\begin{pmatrix} B_1 & B_2 & B_3 \\ L_1 & L_2 & L_3 \\ O_1 & O_2 & O_3 \end{pmatrix}^{-1} \begin{pmatrix} B_0 \\ L_0 \\ O_0 \end{pmatrix} \quad (8)$$

Therefore, it is possible to eliminate the values of the bow, lean, and offset of the scanning line 82 in the scanning unit 22 by adjusting the angle of the reflecting mirror 20 by only $\phi'_{my}$ around the Y-axis and the angles of the plane mirror 42 by only $\phi'_{sx}$, $\phi'_{sy}$ respectively around the X- and Z-axes.

A procedure for actually adjusting the angles of the reflecting mirror 20 and the plane mirror 42 in the scanning unit 22 will be described below.

As shown in FIGS. 2 and 4, after the unit base 30 has been installed on the first, second, and third jigs 58a, 58b, 58c, the first micrometer head 60 of the first adjusting mechanism 24 is operated to turn and move the spindle 62 in the direction X for thereby pressing the upper end of the holder 52. The holder 52 is angularly moved about the pin 54 inserted in the lower end thereof, tilting the reflecting mirror 20 about the Y-axis (see FIG. 5). When the reflecting mirror 20 has been tilted by $\phi'_{my}$, the operation of the first micrometer head 60 is finished, the screws 56 are tightened to secure the holder 52 in the adjusted angular position.

As shown in FIGS. 2 and 3, when the second micrometer head 68 of the second adjusting mechanism 26 is operated, the spindle 72 is moved to push and tilt the casing 44 of the resonant light deflector 16 by $\phi'_{sx}$ about the X-axis while the casing 44 is being guided by the partly spherical surface 46 and the conical surface 36. As shown in FIGS. 2 and 4, when the third micrometer head 70 is operated, the spindle 74 is moved to push and tilt the casing 44 by $\phi'_{sy}$ about the Y-axis. Thereafter, the casing 44 is secured to the first attachment 32 by screws (not shown). After the above adjusting procedure is completed, the unit base 30 is removed from the first, second, and third jigs 58a, 58b, 58c.

In the illustrated embodiment, the reflecting mirror 20 and the resonant light deflector 16 are mounted in the scanning unit 22. The values of the bow, lean, and offset of the scanning line 82 can be eliminated simply by angularly adjusting, i.e., tilting, the reflecting mirror 20 about one axis (the Y-axis) and the resonant light deflector 16 about two axes (the Y- and X-axes).

It is possible to make adjustments to eliminate the bow, lean, and offset of the scanning line 82 in the scanning unit 22, and any of spare scanning units 22 available for replacement can be adjusted in advance. Therefore, when the scanning unit 22 is replaced with a new scanning unit 22, it is not necessary to make readjustments to eliminate the bow, lean, and offset of the scanning line 82 after the new scanning unit 22 is installed in the recording apparatus 10. Accordingly, inasmuch as the number of assembling steps required when the scanning unit 22 is replaced is greatly reduced, the process of replacing the scanning unit 22 is simplified and speeded up.

The resonant light deflector 16 has been shown and described as the light beam deflecting means in the above embodiment. However, a rotating polygonal mirror, a galvanometer mirror, or the like may be employed as the light beam deflecting means. While the light scanning device according to the present invention has been shown and described as being incorporated in the recording apparatus 10, the light scanning device may be incorporated in a reading apparatus.

Although a certain preferred embodiment of the present invention has been shown and described in detail, it should be understood that various changes and modifications may be made therein without departing from the scope of the appended claims.

What is claimed is:

1. A light scanning device comprising:

light beam generating means for generating a light beam; and a detachable scanning unit for scanning a scanned medium in a main scanning direction with the light beam generated by said light beam generating means;

said scanning unit including:

light beam deflecting means for deflecting the light beam from said light beam generating means to scan the scanned medium with the deflected light beam;

a reflecting mirror for guiding the light beam from said light beam generating means to said light beam deflecting means;

a first adjusting mechanism for angularly adjusting said reflecting mirror about one axis to correct for a bow and an offset of a scanning line on the scanned medium in an auxiliary scanning direction substantially perpendicular to said main scanning direction; and a second adjusting mechanism for angularly adjusting said light beam deflecting means about two axes to correct for a bow, a lean and an offset, respectively, of the scanning line on the scanned medium.

2. A light scanning device according to claim 1, wherein said scanning unit has a unit base and a spherical support structure, said light beam deflecting means being tiltably supported on said unit base by said spherical support structure.

* * * * *